Fig. 2.

(No Model.) 8 Sheets—Sheet 3.
W. A. BEEBE.
NEWSPAPER WRAPPING AND ADDRESSING MACHINE.

No. 569,991. Patented Oct. 27, 1896.

Fig. 3.

Witnesses
J. M. Withrow
V. B. Hillyard.

Inventor,
Walter A. Beebe,
By his Attorneys,
C. A. Snow & Co.

(No Model.) 8 Sheets—Sheet 5.

W. A. BEEBE.
NEWSPAPER WRAPPING AND ADDRESSING MACHINE.

No. 569,991. Patented Oct. 27, 1896.

Witnesses:
J. M. Witherow
V. B. Hillyard

Inventor,
Walter A. Beebe,
By his Attorneys,
C. A. Snow & Co.

(No Model.) 8 Sheets—Sheet 6.
W. A. BEEBE.
NEWSPAPER WRAPPING AND ADDRESSING MACHINE.

No. 569,991. Patented Oct. 27, 1896.

Witnesses
J. M. Withrow
V. B. Hillyard

Inventor,
Walter A. Beebe,
By his Attorneys,
C. A. Snow & Co.

(No Model.) 8 Sheets—Sheet 7.

W. A. BEEBE.
NEWSPAPER WRAPPING AND ADDRESSING MACHINE.

No. 569,991. Patented Oct. 27, 1896.

Witnesses
J. M. Witherow
V. B. Hillyard

Inventor
Walter A. Beebe,
By his Attorneys,
C. A. Snow & Co.

THE NORRIS PETERS CO., PHOTO-LITHO., WASHINGTON, D. C.

(No Model.) 8 Sheets—Sheet 8.

W. A. BEEBE.
NEWSPAPER WRAPPING AND ADDRESSING MACHINE.

No. 569,991. Patented Oct. 27, 1896.

Witnesses:
J. M. Withrow
V. B. Hillyard

Inventor,
Walter A. Beebe,
By his Attorneys,
C. A. Snow & Co.

United States Patent Office.

WALTER A. BEEBE, OF KING CITY, CALIFORNIA.

NEWSPAPER WRAPPING AND ADDRESSING MACHINE.

SPECIFICATION forming part of Letters Patent No. 569,991, dated October 27, 1896.

Application filed July 10, 1896. Serial No. 555,551. (No model.)

*To all whom it may concern:*

Be it known that I, WALTER A. BEEBE, a citizen of the United States, residing at King City, in the county of Monterey and State of California, have invented a new and useful Paper Folding, Wrapping, Pasting, and Addressing Machine, of which the following is a specification.

This invention relates to machines for folding, wrapping, pasting, and addressing newspapers of that class known as "single wrappers," and in which each paper is wrapped and addressed separately.

A machine constructed in accordance with this invention embodies in its organization an endless chain or carrier device for feeding or moving the newspaper into position for folding, a pair of revolving rollers between which the wrapping-paper is drawn continuously from a roll, a pair of revolving rollers having intermittent motion and between which the wrapping-paper is brought into position, an impression-hammer which in its descending or advancing movement presses the wrapping-paper against one or more lines of previously-inked type, thereby printing the address as required upon the wrapper, said impression-hammer being rubber-tipped or similarly faced to obviate injury to the type, a pawl for engaging ratchet-teeth extending along the side of the type-galley, so as to bring new type into printing position after each impression or address has been printed, a knife for cutting the wrapping-paper into folding lengths, a vertically-moving folding-blade for giving the initial fold, a horizontally-moving folding-blade for effecting the second or finishing fold, two belts between which the paper is moved toward the rear of the machine, a paste-cup having a paste-distributing wheel whose upper surface is adapted to engage with the edge portion of the wrapper and supply the same with a streak of paste, a folder for gradually turning the edge of the wrapper and folding the same over the pasted or gummed portion thereof, and two rollers between which the folded paper and wrapper pass and by means of which the edge portion of the wrapper is firmly pressed upon the pasted portion, thereby completing the operation.

The improvement consists, essentially, of the novel features and the peculiar construction and combination of the parts which hereinafter will be more fully set forth and claimed and which are illustrated in the accompanying drawings, in which—

The bed or table 1 is supported by similar side standards 2, and the main shaft 3 is journaled, near its ends, in suitable bearings provided on the rear side of the standards 2, near the upper ends of the latter, and this shaft 3 has a band-pulley 4 at one end, by means of which power is applied from any suitable source for driving the shaft 3 and the parts connected therewith. A pocket 5 is formed between the table and a plate 6, placed upon the said table, and this pocket extends from the rear end of the machine to a point about midway of the length of the table and is closed on its sides and front end, its rear end being open for the passage of the wrapping-paper 7, which is provided in a roll and mounted upon a spindle 8. The under side of the plate 6 is recessed, leaving a small margin near the edges of the said plate, which marginal edges rest upon the table 1, so as to form the aforesaid pocket. The rear end of the table 1 curves upwardly, as shown at 9, to facilitate the entrance of the wrapping-paper into the pocket 5. A roller 10 is located opposite an opening extending vertically through the table 1 and plate 6, and its top side terminates in a plane corresponding with the position of the pocket 5, and this roller is journaled in suitable bearings 11, provided at the lower forward ends of side brackets 12, rising vertically from the rear portion of the table 1. A shaft 13 is journaled in bearings 14 immediately above the bearings 11 and formed in the brackets 12, and this shaft is supplied, about midway of its ends, with a rubber-faced wheel 15, which coöperates with the roller 10, so as to draw the wrapping-paper 7 forward and feed it into the front portion of the pocket 5. This shaft 13 is intermittently rotated, being operated at such times only when it is required to feed a length of wrapping-paper into the pocket 5 sufficient to envelop the folded newspaper. A pinion 16 is secured upon one end of the shaft 13, and a corresponding pinion 17 is mounted upon the said shaft 13 so as to turn loosely thereon, and a grooved pulley 18 is secured upon a hub or tubular extension of the pinion 17. A shaft 19 is supported at one end in a standard 20, projecting vertically from the table 1, and at its opposite end by means of an extension 21 of the adjacent bracket 12. Gear-wheels 22 and 23 are mounted upon the shaft 19 so as to turn loosely thereon and mesh, respectively, with the pinions 16 and 17, so as to operate the latter when motion is imparted to the gear-wheels 22 and 23. An arm 24 is loosely mounted upon the shaft 19 and is placed between the gear-wheels 22 and 23, and its outer end pivotally supports oppositely-extending pawls 25 and 26, the pawl 25 being arranged to engage with the teeth of the gear-wheel 22 and the pawl 26 to engage with the teeth of the gear-wheel 23, and these pawls are so disposed that when the one is performing work the other is returning to a normal position without performing any function other than that of regaining itself. Thus it will be seen that when the arm 24 moves downwardly the pawl 25 will engage with the teeth of the gear-wheel 22 and rotate the latter, thereby imparting motion to the shaft 13 through the pinion 16, and during this operation the pawl 26 rides over the teeth of the gear-wheel 23. When the arm 24 moves upwardly at its free end, the pawl 26 will engage with the teeth of the gear-wheel 23 and rotate the latter and the pinion 17, meshing therewith, and the pawl 25 will ride over the teeth of the gear-wheel 22. Thus it will be seen that the gear-wheels 22 and 23 are alternately actuated and rotated in reverse directions.

Any suitable provisions may be had for vibrating the arm 24 about the shaft 19, and, as shown, a pitman 27 has connection at its lower end with a crank 28 of the main shaft 3, and is adjustably connected at its upper end with the arm 24, thereby transmitting motion from the said shaft 3 to the arm 24. By having the pitman 27 adjustably connected with the arm 24 the throw of the latter can be regulated and the movement of the gear-wheels 22 and 23 consequently controlled within certain limits.

A roller 29 is journaled at its ends in bearings of the brackets 12, and a shaft 30, similarly journaled in the said brackets 12, is provided midway of its length with a rubber-faced wheel 31, which engages with the roller 29 and serves to draw the wrapping-paper 7 from the roll. A grooved pulley 32 on one end of the shaft 30 receives its motion from a corresponding grooved pulley 33 on the main shaft 3 by means of a cross-belt 34. Thus in the operation of the machine the shaft 30 is continuously rotated and draws the wrapping-paper from the roll at all times. The wheel 15 and roller 10 are relieved from the duty of drawing the wrapping-paper from the roll and simply serve to feed it in proper lengths to the front portion of the pocket 5. When the parts 15 and 10 are inactive, the paper drawn from the roll will hang loosely in a fold, and when these parts 15 and 10 come into play they quickly take up the slack in the wrapping-paper and advance the same into proper position to form the required length for enveloping the newspaper.

A slot 35 extends vertically through the table 1 and plate 6 and intersects with the pocket 5, and through this slot 35 operates the folding-blade 36, which is guided in its movements by suitable ways formed in the inner or opposing sides of vertical bars 37. The folding-blade 36 and slot 35 extend lengthwise of the table and occur a short distance to one side of the longitudinal center of the pocket 5. As shown, the slot 35 is arranged to the right of the longitudinal center of the pocket, thereby making the right-hand portion of the pocket of less length than the left-hand portion or that part arranged to the left of the slot 35. By this disposition of the parts the left-hand edge portion of the wrapping-paper will be of greater length than the right-hand portion when the parts are folded, the left-hand portion being of greater length than the right-hand portion by a length corresponding to the distance of the slot 35 from the longitudinal center of the pocket. This extra length of the wrapper forms the flap, which is folded and pasted in the process of completing the wrapping or jacketing of the newspaper. The vertical bars 37 are braced at their upper ends by stays 38, whose members incline in opposite directions, and are secured at their lower ends to suitable parts of the framework, which in the present instance are transverse bars 39. These stays 38 are connected at their upper ends by means of a cross-bar 40, and the stay nearer the rear end of the machine strengthens the upper end of a post or bar 41, which extends parallel with the adjacent bar 37, and is secured at its lower end to the contiguous cross-bar 39.

Immediately in front of the roller 10 is arranged a stationary cutter 42, whose upper edge is about in the same plane with the top side of the roller 10 and with the pocket 5. A movable knife 43 is arranged to act in opposition to the cutter 42 and sever the wrapping-paper into proper lengths to form the wrappers, and this knife has its cutting edge sloping gradually from its middle outwardly in opposite directions, so as to cut the paper by a shear action. The ends of the knife 43 operate in the inner grooved sides of projections 44, formed on the lower front ends of the brackets 12, and oppositely-inclined bars 45 connect at their lower ends with the knife 43, and are united at their upper ends, forming a head, in which is provided a vertical slot 46 for the reception of a pin 47, extending laterally from the post or bar 41. The pin 47 and slot 46 serve, in conjunction with the guide projections 44, to steady and direct the knife 43 in its vertical movements. A lever 48 is fulcrumed at one end to a bracket 49, and its opposite end is connected by means of a pitman 50 with the yoke 51 of a lever 52, and an eccentric 53 on the shaft 3 operates between the members of the yoke 51, so as to vibrate the lever 52 and impart a vertical reciprocatory movement to the knife 43. A plate 54 is attached to the knife 43 and is formed at its upper end with a laterally-extending stud 55, which operates in a slot of the lever 48, and by means of which attachment is had between the said knife 43 and its operating-lever 48.

A short shaft 56 is journaled in a bearing 57 to one side of the machine, and is driven from the shaft 3 by bevel-gearing 58, and a crank 59 at one end of the shaft 56 is connected by means of a pitman 60 with the lower end of a vertically-disposed lever 61, which has its upper end connected with pitmen 62 and 63, the upper end of the pitman 63 connecting with a lever 64, which in turn has connection by means of a link 65 with the vertical folding-blade 36, whereas the pitman 62 has connection with the horizontal folding-blade 66. The actuating mechanism for the vertical and horizontal folding-blades is so timed and proportioned that when the folding-blade 36 is rising the folding-blade 66 is moving forward, and vice versa.

A casing 67 is pendent from the table 1, and is provided on its front and rear walls with parallel cleats 68, between which the folding-blade 66 operates. Set-screws 69 operate through threaded openings in the walls of the casing, and their inner ends touch the edges of the folding-blade 66 and prevent sidewise movement of the latter during its advancing and receding movements. A slot 70 is formed in the inner wall of the casing 67 for the folding-blade 66 to operate through, and the inner corners of the slot are beveled to prevent injurious contact of the paper therewith. The inner vertical wall 71 of the casing 67 is arranged to one side of the slot 35 and forms a support for the paper after it has received its initial fold. A space or passage 72 is arranged opposite to the slot 70 and is formed between the adjacent sides of traveling belts 73 and 74, the endless belt or apron 73 being uppermost and about twice the length of the lower belt or apron 74.

The opposing sides of the belts 73 and 74 are parallel, and the belt 74 is but a trifle longer than the width of the folding-blade 66, and the two belts travel so that their contiguous portions move in the same direction and toward the rear of the machine. The distance between the proximate portions of the belts 73 and 74 corresponds to the width of the slot 70, so that the paper and wrapper after passing through the slot 70 will be received and held in a folded condition between the adjacent portions of the said belts. The belt 74 is supported at its ends upon rollers 75 and 76. The belt 73 is supported at its ends upon rollers 77 and 78, and its upper portion is depressed so as to clear the type-galley race 79 and the roller 10 by means of a roller 80. The roller 77 is mounted upon a shaft 81, which is journaled in suitable bearings provided at the rear end of the machine, and has a grooved pulley 82 at one end which supports one end of a cross-belt 83, the opposite end of the said belt being supported by a corresponding grooved pulley 84 at the end of the roller 75. A grooved pulley 85 is provided on the outer end of the shaft 81, and is driven from the grooved pulley 18 by means of the belt 86, the lower portion of which is deflected by means of an idler 87, so as to clear the type-galley race 79. It will be remembered that the grooved pulley 18 is intermittently operated. Hence the belts 73 and 74, which receive their motion from the grooved pulley 18 through the intermediate connections just described, are intermittently actuated, the driving mechanism being so timed that the belts 73 and 74 are driven immediately after the operation of the horizontal folding-blade 66.

Figure 1:
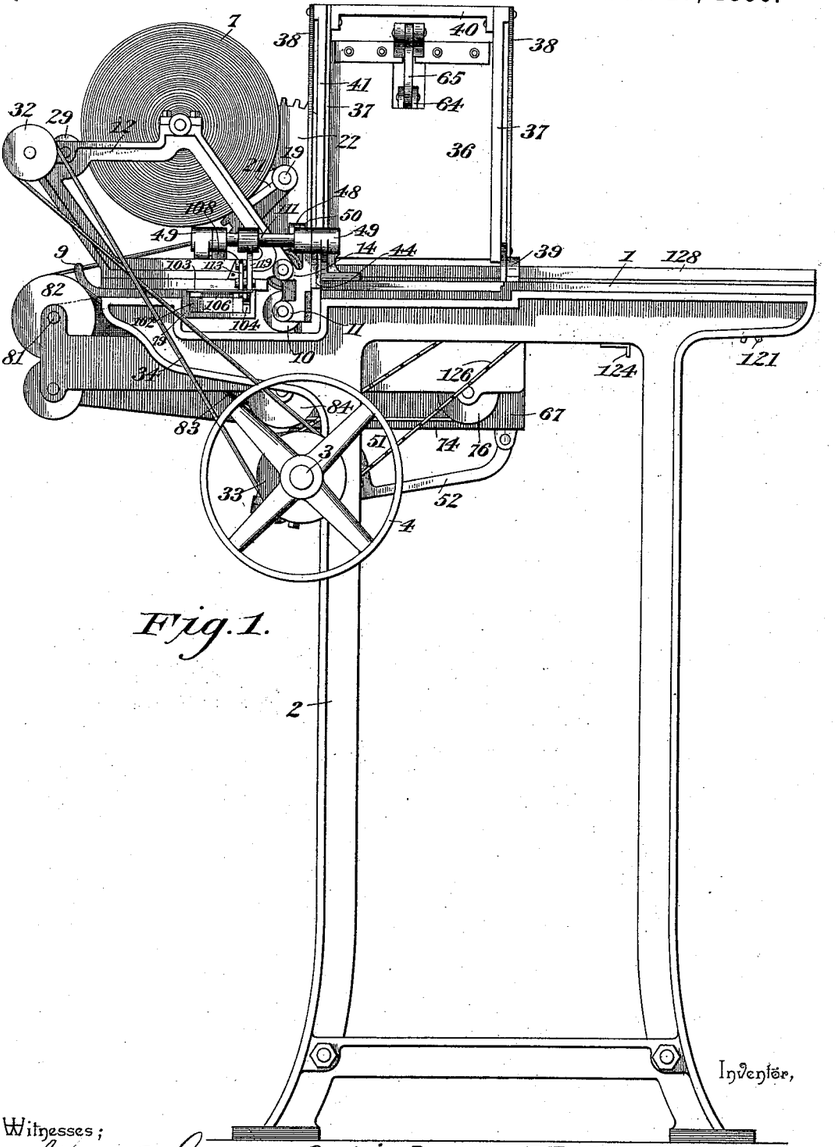
Figure 1 is a side elevation of a machine constructed in accordance with and embodying the vital features of the invention.
Figure 2:
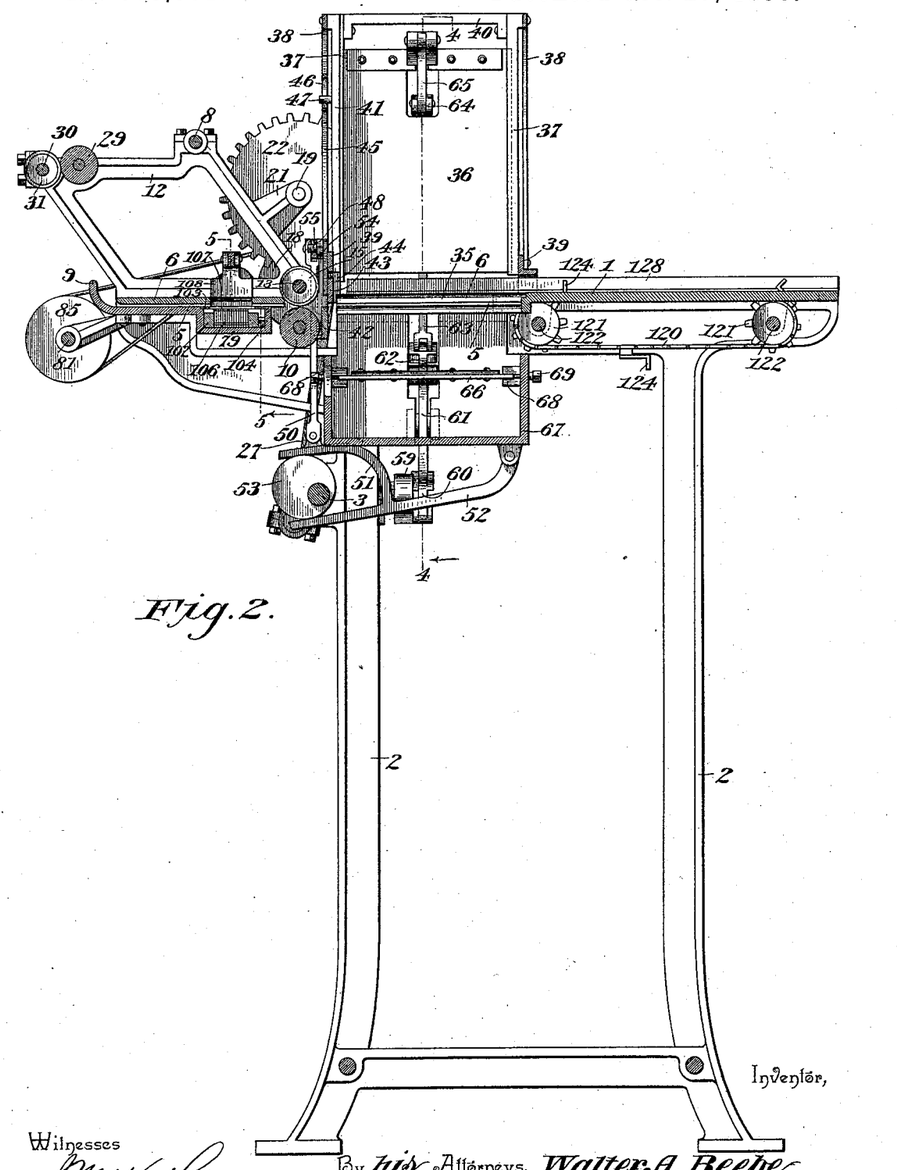
Fig. 2 is a vertical section on the line 2 2 of Fig. 3, looking in the direction of the arrow.
Figure 3:
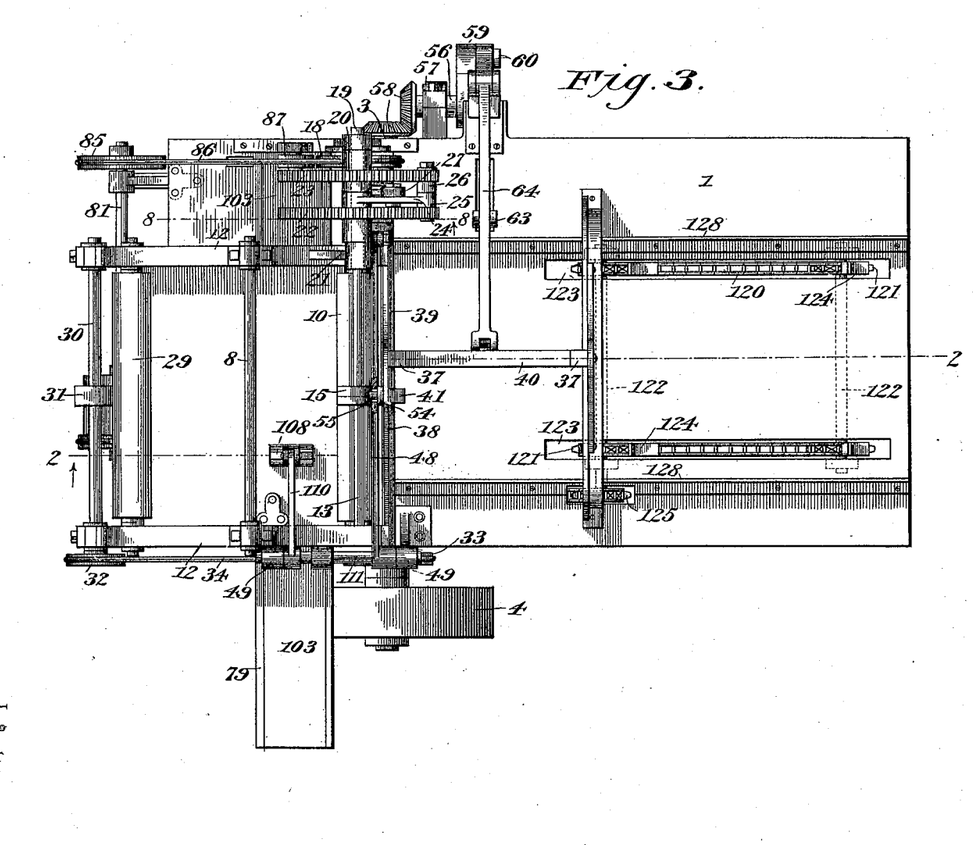
Fig. 3 is a top plan view of the machine.
Figure 4:
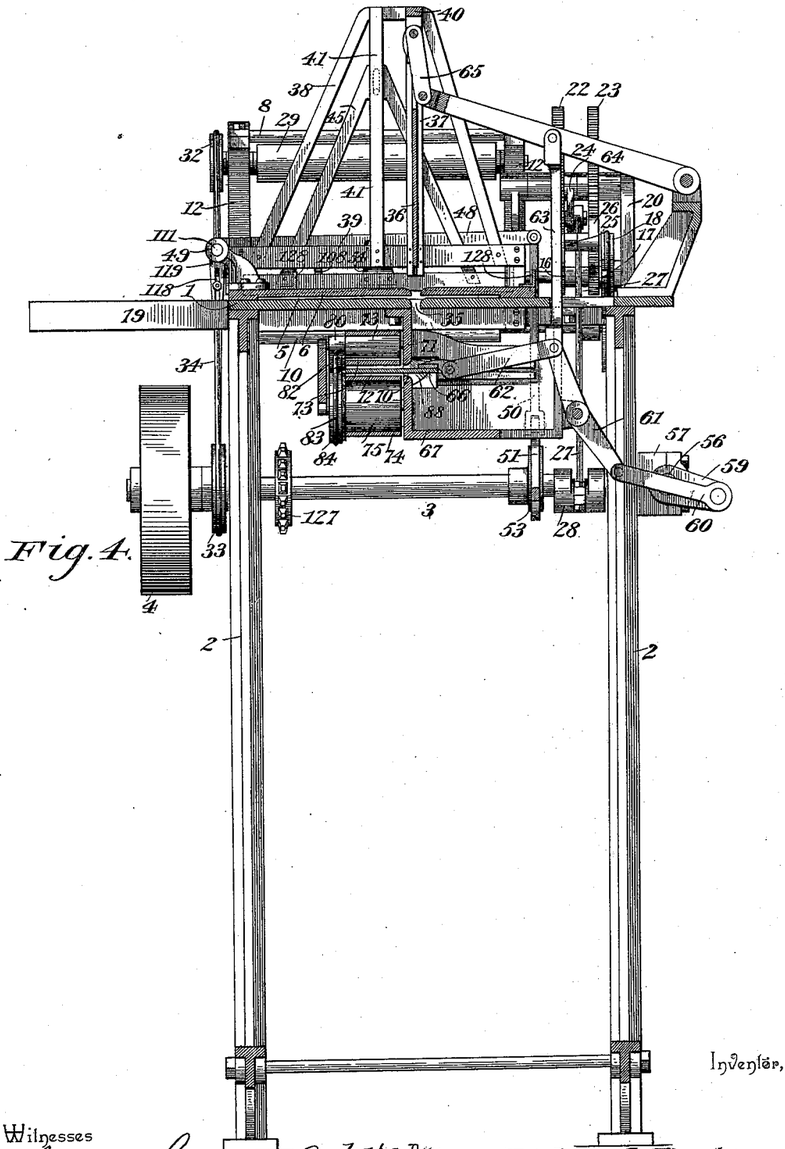
Fig. 4 is a section on the line 4 4 of Fig. 2, looking to the left, as shown by the arrow.
Figure 5:
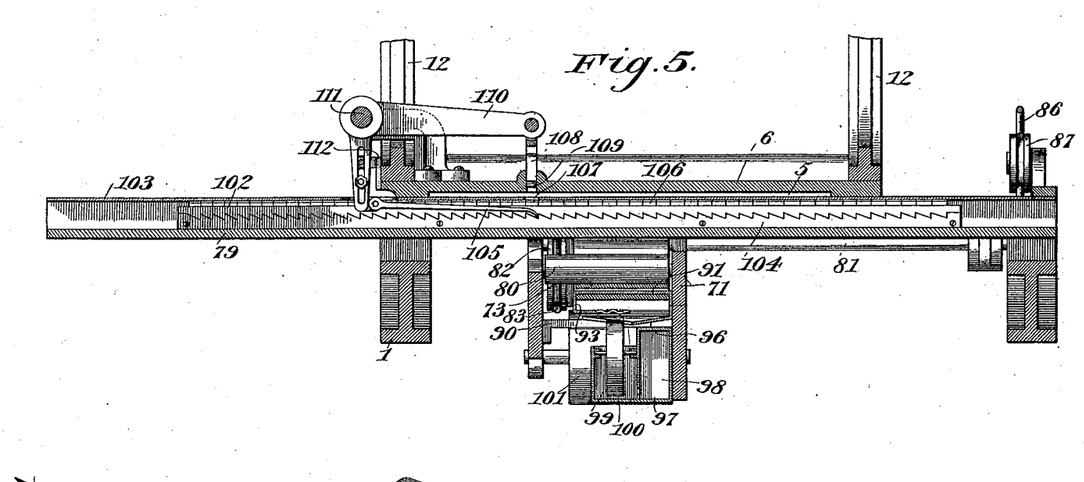
Fig. 5 is a longitudinal section of the type-galley and a cross-section of the folding and pasting mechanism and the parts immediately associated therewith, the same being taken on the line 5 5 of Fig. 2, looking to the left, as indicated by the arrow.
Figure 6:
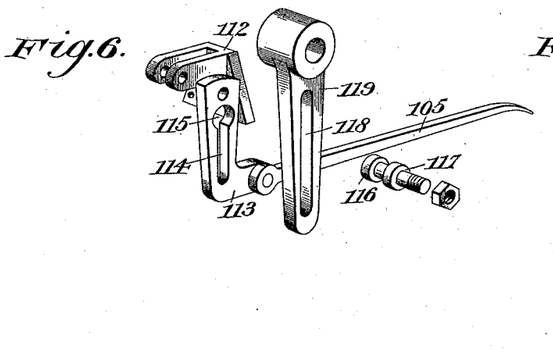
Fig. 6 shows the type-galley actuating-pawl, its operating provisions and mountings, the said parts being disconnected and arranged in a group.
Figure 7:
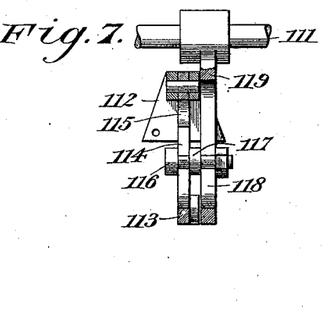
Fig 7 is a detail view of the parts shown in Fig. 6, illustrating their relative arrangement when assembled.
Figures 8, 9, 10, 11:
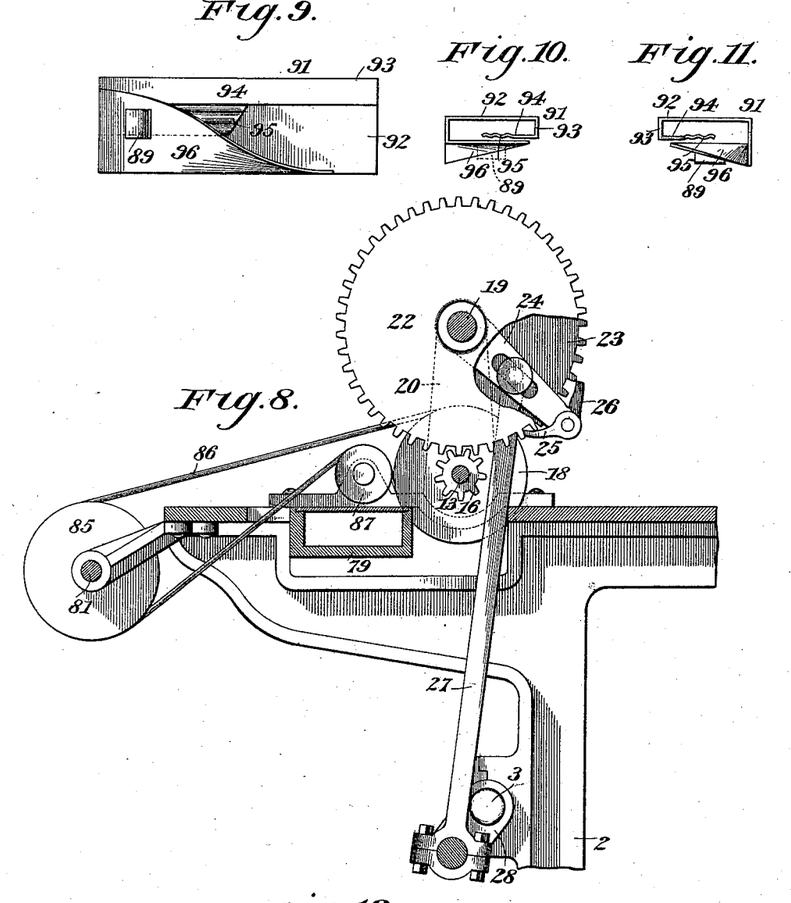
Fig. 8 is a detail section on the line 8 8 of Fig. 3, looking in the direction of the arrow.
Figs. 9, 10, and 11 are respectively a bottom plan front and rear view of the folder.
Figure 12:
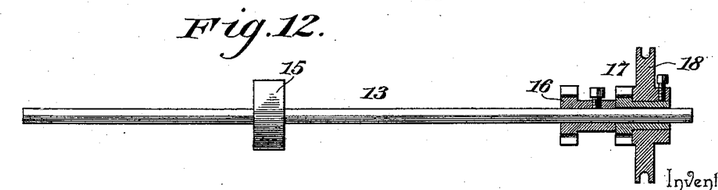
Fig. 12 is a detail view of the intermittently-operated shaft for feeding the wrapping-paper in proper lengths for each newspaper.
Figure 13:
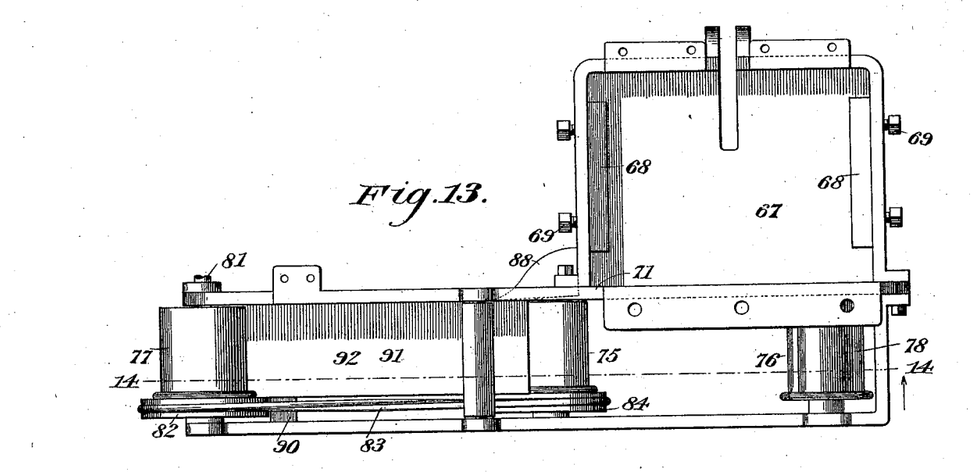
Fig. 13 is a top plan view of the horizontally-folding blade and the wrapper-compressing mechanism.
Figure 14:
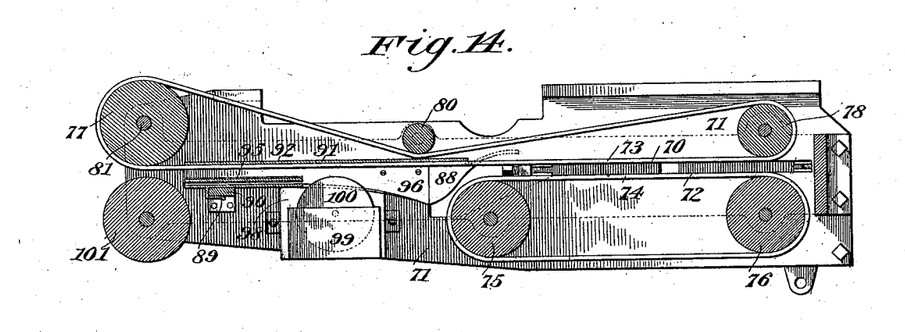
Fig. 14 is a section on the line 14 14 of Fig. 13, looking in the direction of the arrow.
Figure 15:
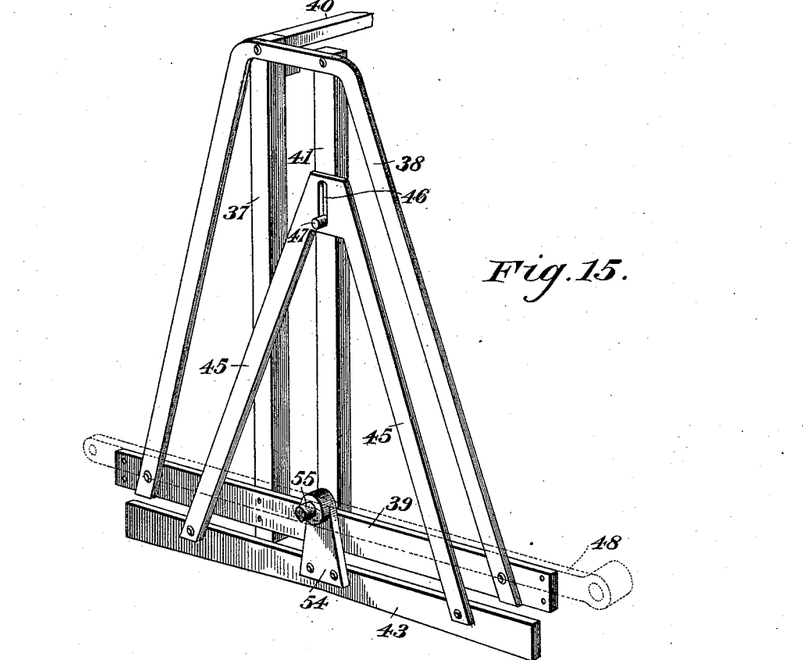
Figs. 15 and 16 are detail views of the knife for cutting the wrapping-paper into proper lengths and its mountings.
Figure 16:
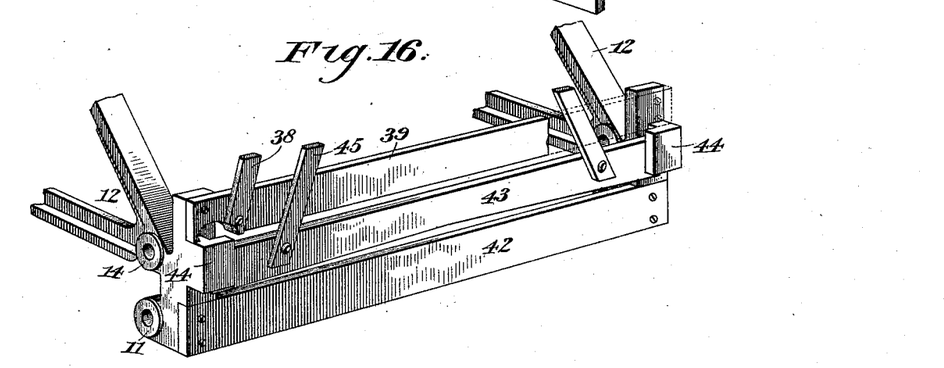

It must be borne in mind that an edge portion of the wrapper projects beyond the edge of the companion fold after the said wrapper receives its initial fold. This projecting edge portion extends horizontally after the wrapper has received its second fold and projects through the slot 70. In order to cause this projecting edge portion to assume a vertical position as the folded newspaper and wrapper are carried toward the rear of the machine, a deflector or curved plate 88 is provided and located to the rear of the slot 70. This deflector 88 makes a quarter-turn and flares at the end facing the slot 70, and its purpose is to turn the projecting edge portion of the wrapper herein referred to from a horizontal to a vertical position, so as to clear the prolongation of the vertical wall 71. The folder is located in the rear of the deflector 88, and is held in place by any suitable means, and, as shown, is provided with a hook 89, to be engaged with a cross-bar 90. This folder 91 is preferably formed of sheet metal, which is bent to form a flattened tube of the form substantially as shown in Figs. 10 and 11.

The upper portion 92 of the folder is closed, as is also its outer side 93, whereas the lower side is open for the greater portion of its length at its inner or receiving end. A lower edge portion 94 extends parallel with the upper portion 92 and is widened a short distance from the rear end of the folder, as shown at 95, and this widened portion 95 is longitudinally crimped or corrugated, so as to prevent an extended bearing-surface upon the pasted or gummed portion of the wrapper. The bottom portion 96 of the folder gradually increases in width from the front to the rear end of the folder, and also gradually curves from a vertical to a horizontal position, the horizontal portion being the widest and the vertical portion the narrowest, whereas the intermediate portion is of a varying length and gradually curves from a vertical to the horizontal. The rear part of the bottom portion 96 overlaps the rear portion of the ledge 94, and a slight space is formed between the opposing faces of the overlapped parts to provide for the passage of the folded edge portion of the wrapper, which edge portion is folded from a vertical position by means of the bottom portion 96 of the folder, as will be readily comprehended.

The paste-cup 97 is located opposite the open bottom portion of the folder and comprises a reservoir 98 and a chamber 99 in communication with the reservoir 98, and in which operates a distributing-wheel 100. This wheel 100 receives the paste or gum from the chamber 99, and supplies the same in a streak upon the horizontal portion of the wrapper just prior to the folding of the edge portion of the said wrapper upon the pasted or gummed part.

The lower portion of the belt or apron 73 travels through the upper part of the folder 91 and moves the folded paper and wrapper therethrough, said paper being supported at the receiving end of the folder 91 by the ledge 94. The folded paper is advanced to the rear end of the machine and carried through the folder 91 by the frictional contact between the said paper and the belt or apron 73. A compression-roller 101 is located opposite to and immediately below the roller 77 and coöperates therewith to compress the wrapper and newspaper as they emerge from the folder 91, thereby pressing the folded edge portion of the wrapper firmly against the gummed or pasted portion thereof.

The type-galley race 79 extends transversely of the table and is closed at its top by means of a thin plate 103, and the type-galley 102 is adapted to operate in the race 79 and is formed on one side with a ratchet-bar 104, the teeth of which are engaged by means of a pawl 105, so as to move the galley step by step through the race, so as to bring the type 106 successively opposite an opening 107 in the plate 103 for the proper printing of the name and address upon the wrapper. An impression-hammer 108 operates through a reinforced opening 109 in the plate 6 opposite the opening 107, and is supported on the inner end of an arm 110, secured upon a shaft 111, which is journaled in bearings 49, and upon which the lever 48 is mounted, and to which it is secured, so that the lever 48 and shaft 111 operate together, thereby causing a vibration of the arm 110 and a vertical movement of the impression-hammer 108. This impression-hammer is rubber-faced or otherwise clothed, so as to prevent injury to the type 106. A bracket 112 is secured to the framework of the machine, and a bell-crank lever 113 is pivotally supported by means of the said bracket 112, and the pawl 105 is pivotally connected to its horizontal member. The vertical portion of the lever 113 has a slot 114 extending lengthwise thereof, and this slot is enlarged at its upper end, as shown at 115, so as to receive the head 116 of a stub-bolt 117, which is adjustably secured in the slot 118 of an arm 119, secured upon the shaft 111. Thus it will be seen that the arms 119 and 110 are simultaneously actuated by the rocking movements of the shaft 111, which latter is operated by means of the lever 48. By reason of the adjustable connection between the arm 119 and the bell-crank lever 113 the throw of the pawl 105 can be controlled so as to adapt the mechanism for type-galleys having rack-bars whose teeth vary in size according to the character of the address-type. Moreover, by this means provision is had to properly position the pawl 105, so that the printing-type will come opposite the opening 107 and the impression-hammer 108.

The feeder for carrying the newspaper under the folding-blade 36 comprises two endless chains 120, which are supported upon sprocket-pinions 121, mounted upon shafts 122. These endless chains 120 operate in slots 123, provided in the table, and are supplied at proper intervals with projections 124, which engage with the newspapers and move the same forward. A sprocket-wheel 125 is secured upon the projecting end of one of the shafts 122, and is connected by a sprocket-chain 126 with a corresponding sprocket-wheel 127 on the main shaft 3. Suitable guides 128 extend in parallel relation and in close proximity to the edges of the table, and are intended to direct the newspapers in their forward movement to the folding mechanism.

The operation of the machine can be readily comprehended from the foregoing detailed description, but it may be well to state, briefly, the general mode of using the machine. The newspaper as it comes from the ordinary printing-machine is partially folded and is delivered upon the table 1, and is moved forward by the carrier 120 to a position immediately beneath the vertical folding-blade 36 and over the inner or front portion of the pocket 5. During this operation a length of wrapping-paper is fed into the front portion of the pocket 5 and is severed by the cutting apparatus. The vertical folding-blade descends and folds the newspaper and wrapper through the slot 35, and immediately thereafter the horizontal folding-blade moves forward and folds the paper and wrapper a second time and carries them through the slot 70 into the passage 72, whose walls, traveling in the manner set forth, grasp the sides of the paper and wrapper and move the same toward the rear end of the machine. The paper in its rearward travel has the projecting edge portion of the wrapper bent from a horizontal to a vertical position by means of the deflector 88, and after the horizontal portion of the wrapper is pasted or gummed the said vertical edge portion of the wrapper is bent into a horizontal position by means of the folder 91, and is compressed while passing between the rollers 101 and 77, thereby completing the operation. The address-printing type are previously inked before the galley is placed into the race, and the printing is effected by the impression-hammer forcing a portion of the wrapper from the pocket 5 through the opening 107 in the top of the type-galley race. This operation takes place immediately upon the proper positioning of the wrapper in the front portion of the pocket and during the descent of the vertical folding-blade.

It is contemplated to provide the machine in different sizes and in different styles to suit the nature of the work and to fit the machine with which it is designed to be used. Therefore in the embodiment thereof various changes in the form, proportion, and the minor details of construction may be resorted to without departing from the principle or sacrificing any of the advantages of this invention.

While the folding-passage is shown angular in the drawings, it is to be understood that this form is not essential to the successful operation of the device, and in practice the angles will be dispensed with and the bends made on curved lines, so as to correspond more nearly to the form of the folded newspaper. The paste-distributing wheel 100 is rotated by engagement therewith of the paper, so as to bring a freshly-gummed portion in position for supplying the paste or gum to the part or portion of the wrapper to be pasted. By having the rollers 31 and 29 continuously rotated the paper is unwound steadily and uniformly from the roll 7 and jerky and uneven movements are obviated, as the same are objectionable.

Having thus described the invention, what is claimed as new is—

1. In a paper folding, addressing and wrapping machine, the combination with the folding mechanism, of intermittently-rotated feed-rollers, a delivery mechanism, a pair of gear-wheels mounted independently in axial alinement and operatively connected with, respectively, the intermittently-rotated feed-rollers and the delivery mechanism, an arm mounted in line with the axis of the said gear-wheels and carrying oppositely-disposed pawls to alternately engage with and operate the aforesaid gear-wheels, and actuating mechanism for vibrating the pawl-bearing arm, substantially as set forth for the purpose described.

2. In a paper folding, addressing and wrapping machine, the combination of the folding mechanism, a table having a horizontal pocket, a pair of continuously-rotating rollers in a higher plane than the table for drawing the wrapping-paper from the roll, a pair of intermittently-rotated rollers located in the length of the table and having the space between them corresponding with the plane of the said pocket, and adapted to feed the wrapping-paper in required lengths through the pocket to the folding mechanism, an address-printing mechanism arranged in the length of the table in advance of the intermittently-rotated rollers and comprising printing-type below the table and an impression-hammer above the table, a rock-shaft disposed at one side of the table, an arm extending horizontally from the rock-shaft and bearing the impression-hammer, a vertical arm pendent from the rock-shaft, and a pawl having pivotal connection with the pendent arm and adapted to move the printing-type, substantially as described.

3. In a paper folding, addressing and wrapping machine, the combination of a table having a horizontal pocket extending inward from one end and adapted to support the newspaper to be folded and wrapped upon the other end portion, an endless carrier having projections to engage with and feed the newspapers over the latter end of the table to a position over the inner end of the said pocket, means for feeding the wrapping-paper into and through the said pocket, a cutter operating across the aforesaid pocket for severing the wrapping-paper into the required length, a vertical folding-blade adapted to operate through a vertical slot extending through the table and intersecting with its pocket to force the newspaper across the latter, an address-printing mechanism comprising an impression-hammer operating across the said pocket and printing-type placed below the table, a rock-shaft, a lever for actuating the rock-shaft and cutter, and arms extending from the rock-shaft to operate the impression-hammer and the printing-type, substantially as set forth for the purpose described.

4. In a machine of the character specified, the combination of a table having a horizontal pocket extending therein from one end, a folding-blade arranged lengthwise of the table and operating through a longitudinal slot intersecting with the said pocket, a pair of intermittently-operated feed-rollers transversely arranged between the ends of the pocket and adapted to move the wrapping-paper therethrough, a type-galley parallel with the feed-rollers and bearing the address-printing type, and located below the plane of the pocket, an impression-hammer disposed above and adapted to operate across the pocket, a rock-shaft at the side of the table, a horizontal arm extending from the rock-shaft and bearing the impression-hammer, and a pawl having adjustable connection with an arm pendent from the rock-shaft, substantially as set forth.

5. In combination, a table having an end portion curving upwardly, a plate fitted to the table and forming a pocket therewith, a pair of continuously-rotated rollers located above the curved end of the table, a pair of intermittently-rotated feed-rollers disposed in the length of the pocket, the one above, the other below the plane thereof, an address-printing mechanism located in advance of the intermittently-operated feed-rollers, a folding-blade adapted to operate across the pocket to one side of the intermittently-operated feed-rollers, a cutting mechanism placed between the folding-blade and the intermittently-operated feed-rollers, and a lever for transmitting motion to the address-printing and the cutting mechanisms, substantially as set forth for the purpose described.

6. In combination, a table having a slot, vertically-disposed bars grooved on their inner sides, a folding-blade mounted in the grooves of the said bars and operating through the slot of the table, stays having oppositely-disposed members for strengthening and bracing the grooved bars, a post having connection with one of the stays and having a laterally-extending projection, a cutter, converging bars secured at their separated ends to the cutter and having their converging ends connected by a head which is slotted to receive the projection of the said post, and actuating mechanism for the cutter, substantially as set forth.

7. In a paper folding, addressing and wrapping machine, the combination of a reciprocating cutter, a plate attached to the cutter and having a lateral stud, a rock-shaft, a lever connected with the rock-shaft and having a slot to receive the aforesaid stud, a type-galley slidably mounted and having a rack-bar, an arm extending from the said rock-shaft, and a pawl having pivotal and adjustable connection with the said arm and adapted to engage with the teeth of the said rack-bar to move the type-galley to bring the type in proper position, substantially as and for the purpose set forth.

8. In a paper folding, addressing and wrapping machine, the combination of a table having a horizontal pocket, a race extending laterally therefrom and closed at its top side, a type-galley slidably mounted in the race and having a rack-bar, a rock-shaft, arms extending from the rock-shaft at approximately right angles to each other, a pawl having pivotal and adjustable connection with the pendent arm and adapted to engage with the rack-bar to move the type-galley within the race, an impression-hammer having connection with the other arm and adapted to operate through an opening in the top of the race and across the pocket in the table so as to bring the wrapping-paper in engagement with the type of the galley, a cutting mechanism, and a lever having connection with the rock-shaft and cutting mechanism, substantially as and for the purpose set forth.

9. In combination, a slidable type-galley carrying the address-printing type and provided with a rack-bar, a rock-shaft, an arm extending horizontally from the rock-shaft and bearing an impression-hammer, a second arm pendent from the rock-shaft and having a vertical slot, a lever vertically slotted, a stub-bolt adjustably connecting the lever with the pendent arm and movable in the slots thereof, and a pawl having pivotal connection with the said lever and adapted to engage with the rack-bar to move the type-galley forward upon the ascent of the impression-hammer, substantially as set forth.

10. In combination, a type-galley carrying the address-printing type and provided with a rack-bar, a rock-shaft, a pendent arm longitudinally slotted and secured to the rock-shaft, a lever pivoted at one end and longitudinally slotted, a pawl having connection with the said lever and adapted to engage with the rack-bar, and an adjustable connection movable in the slots of the said arm and lever, whereby the pivotal connection between the two can be varied to regulate the throw of the said pawl, substantially in the manner set forth.

11. The combination with a slotted plate or wall, and a folding-blade to operate through the said slot, of two endless belts or aprons disposed with their adjacent sides in proximate relation and forming a passage opposite the slot of the said plate or wall, substantially as set forth.

12. In a machine of the character specified, the combination with the wrapping-paper-feeding mechanism, and an endless belt or apron for carrying the folded and wrapped paper from the machine, of a shaft having a tight and a loose pinion, two gear-wheels meshing with the respective pinions, a vibrating arm carrying two oppositely-disposed pawls to engage alternately with the teeth of the respective gear-wheels, and actuating mechanism for vibrating the pawl-carrying arm, the tight pinion being operatively connected with the said wrapping-paper-feeding mechanism and the loose pinion with the said belt or apron, substantially in the manner set forth.

13. In a paper folding, addressing and wrapping machine, the combination with a folder consisting of a flattened tube having its bottom side gradually increasing in width and gradually curving from a vertical to a horizontal position from the receiving to the discharge end of the folder, of a traveling belt operating in the upper portion of the folder and approximating the width thereof, substantially as set forth for the purpose described.

14. In combination, a folder for turning the marginal or projecting edge portion of the wrapper, consisting of a flattened tube having its bottom portion gradually widening and curving from the entrance to the delivery end of the folder, an endless belt having its upper portion about in the same plane as the bottom side of the folder, and a second endless belt having its bottom portion operating through the upper portion of the folder and corresponding in width thereto, and forming a passage with the first-mentioned belt to receive the folded and wrapped newspaper, substantially as set forth for the purpose described.

15. In combination, a vertically-disposed wall having a slot, a folding-blade operating through the said slot, two belts or aprons having their contiguous portions arranged to form a passage opposite the said slot, a deflector located at the rear end of the said slot for folding the horizontal marginal or projecting edge portion of the wrapper into a vertical position, and a folder in the rear of the deflector for turning the said marginal portion of the wrapper into a horizontal position, substantially as set forth for the purpose described.

16. The herein-described folder, approximating the form of a flattened tube and having its lower portions overlapping and spaced apart, the upper overlapping portion being longitudinally fluted or corrugated, substantially as set forth for the purpose described.

17. The herein-described folder, appearing as a flattened tube and having an inwardly-extending ledge at one side which is widened at its rear portion, and having an inwardly-extending portion at the opposite edge which gradually increases in width and curves from the vertical to the horizontal, one of the overlapping bottom portions being longitudinally fluted, substantially as and for the purpose set forth.

18. The herein-specified folder, approximating the form of a flattened tube which is open on one side for a distance from one end, and having a projecting ledge which widens at the end opposite the open side, said widened portion being longitudinally fluted or corrugated, and having the portions opposite and in the plane of the open side overlapping, substantially as set forth for the purpose described.

19. A machine for the purposes described comprising a table having a pocket, a feeder continuously operated for advancing the newspapers into proper position, a pair of continuously-rotated rollers for drawing the wrapping-paper from the roll, a second pair of intermittently-operated rollers for feeding the paper in proper lengths into the said pocket, a cutting mechanism for severing the wrapping-paper, an address-printing mechanism located between the two pairs of feeding-rollers, a vertical folding-blade operating through the pocket, a horizontal folding-blade, a passage opposite the horizontal folding-blade and formed by the adjacent portions of two traveling belts or aprons, a deflector, a pasting device, a folder for turning the marginal edge of the wrapper, rollers for compressing the folded parts of the wrapper, and actuating mechanism for the operating parts, substantially as set forth for the purpose described.

In testimony that I claim the foregoing as my own I have hereto affixed my signature in the presence of two witnesses.

WALTER A. BEEBE.

Witnesses:
J. E. CHOPE,
L. B. WHEREY.